(12) United States Patent
Mayorga et al.

(10) Patent No.: US 6,280,503 B1
(45) Date of Patent: Aug. 28, 2001

(54) CARBON DIOXIDE ADSORBENTS CONTAINING MAGNESIUM OXIDE SUITABLE FOR USE AT HIGH TEMPERATURES

(75) Inventors: Steven Gerard Mayorga, Allentown; Scott Jeffrey Weigel, Allentown; Thomas Richard Gaffney, Allentown; Jeffrey Richard Brzozowski, Macungie, all of PA (US)

(73) Assignee: Air Products and Chemicals, Inc., Allentown, PA (US)

( * ) Notice: Subject to any disclaimer, the term of this patent is extended or adjusted under 35 U.S.C. 154(b) by 0 days.

(21) Appl. No.: 09/370,006

(22) Filed: Aug. 6, 1999

(51) Int. Cl.$^7$ .................................................. B01D 53/02
(52) U.S. Cl. .................................. 95/96; 95/97; 95/104; 95/121; 95/122; 95/139; 95/148
(58) Field of Search ................................. 95/91, 95, 96, 95/97, 101, 102, 104, 121, 122, 139, 148; 423/220, 230, 232, 233, 225; 502/514; 252/192

(56) References Cited

U.S. PATENT DOCUMENTS

| | | |
|---|---|---|
| 1,831,731 | 10/1931 | Al . |
| 3,141,729 | 7/1964 | Clarke ........................ 23/4 |
| 3,232,028 * | 2/1966 | McDonald et al. ............... 95/139 |
| 3,489,693 * | 1/1970 | Bovard ........................ 423/230 |
| 3,511,595 | 5/1970 | Fuchs ........................ 23/4 |
| 3,865,924 | 2/1975 | Gidaspow et al. ............... 423/230 |
| 4,433,981 | 2/1984 | Slaugh et al. .................. 55/59 |
| 4,482,361 * | 11/1984 | Whysall ....................... 95/139 |
| 4,493,715 | 1/1985 | Hogan et al. ................... 55/68 |
| 4,508,690 * | 4/1985 | Obrist et al. ................... 423/173 |
| 4,656,156 * | 4/1987 | Misra ........................ 502/415 |
| 4,937,059 * | 6/1990 | Kolts et al. .................... 423/230 |
| 5,079,209 * | 1/1992 | Nalette et al. .................. 502/411 |
| 5,214,019 * | 5/1993 | Nalette et al. .................. 423/232 |
| 5,390,667 * | 2/1995 | Kumakura et al. ............. 128/205.12 |
| 5,454,968 * | 10/1995 | Nalette et al. .................. 423/232 |
| 5,520,894 | 5/1996 | Heesink et al. ................. 423/230 |
| 5,681,503 * | 10/1997 | Nalette et al. .................. 423/232 |

OTHER PUBLICATIONS

A Comprehensive Treatise on Inorganic and Theoretical Chemistry, J. W. Mellor, John Willey & Sons, N.Y., vol. 4, pp. 367–376 (1960).

* cited by examiner

*Primary Examiner*—Duane Smith
*Assistant Examiner*—Jason M. Greene
(74) *Attorney, Agent, or Firm*—Keith D. Gourley

(57) ABSTRACT

Adsorption of carbon dioxide from gas streams at temperatures in the range of 300 to 500° C. is carried out with a solid adsorbent containing magnesium oxide, preferably promoted with an alkali metal carbonate or bicarbonate so that the atomic ratio of alkali metal to magnesium is in the range of 0.006 to 2.60. Preferred adsorbents are made from the precipitate formed on addition of alkali metal and carbonate ions to an aqueous solution of a magnesium salt. Atomic ratios of alkali metal to magnesium can be adjusted by washing the precipitate with water. Low surface area adsorbents can be made by dehydration and $CO_2$ removal of magnesium hydroxycarbonate, with or without alkali metal promotion. The process is especially valuable in pressure swing adsorption operations.

9 Claims, 4 Drawing Sheets

Cyclic Stability of Potassium Double Salt and Promoted HTC in the Presence of Steam and $CO_2$

CARBON DIOXIDE ADSORBENTS CONTAINING MAGNESIUM OXIDE SUITABLE FOR USE AT HIGH TEMPERATURES

STATEMENT REGARDING FEDERALLY SPONSORED RESEARCH OR DEVELOPMENT

The subject matter presented in this patent application was funded in part by the United States Department of Energy (DOE) under Cooperative Agreement No. DE-FC36-95GO10059. The DOE may have certain rights under the claims of any patent issuing from this application.

CROSS-REFERENCE TO RELATED APPLICATIONS

Not applicable.

FIELD OF THE INVENTION

This invention relates to a process for adsorbing carbon dioxide from a gas stream at temperatures ranging form 300 to 500° C. which utilizes adsorbents containing magnesium oxide. In another aspect it relates to a promoted magnesium oxide adsorbent having a unique composition.

BACKGROUND OF THE INVENTION

For most of the twentieth century the removal of carbon dioxide from other gases has been the subject of considerable industrial research. Many processes have been developed for this purpose. The most common methods for separating out carbon dioxide involve selective adsorption, often with reversible chemical reactions of the carbon dioxide with chemicals in the sorbent. Well known methods involve bubbling a gas stream containing carbon dioxide through caustic liquids, such as alkanol amine solutions or solutions containing soda, ammonia and/or carbonates, that adsorb $CO_2$ through the formation of metal carbonate salts, such as $Na_2CO_3$. A process of this type is described in U.S. Pat. No. 1,831,731, J. Al, (1931) which discloses reacting $CO_2$ with $K_2CO_3$ in the presence of water to form $KHCO_3$. The alkali carbonate can be regenerated with ammonia. These liquid systems are costly, tend to entrain liquid in downstream equipment, generally require high maintenance, and are practical only at moderate temperatures, e.g. 20 to 50° C.

A number of solid state adsorbents have been developed to avoid the above-mentioned problems associated with liquid systems. For example, U.S. Pat. No. 3,141,729, Clarke et al., (1964) describes removing $CO_2$ from an atmosphere with a cogel of a lithium or divalent metal oxide with a trivalent metal oxide, such as $MgO.Al_2O_3$. Also, U.S. Pat. No. 5,520,894, Heesink et al., (1996) discloses removing $CO_2$ from a hot gas stream such as flue gas with a solid absorbent of CaO, MgO or $CaCO_3$. MgO. These systems require elaborate operating procedures, such as preprocessing the gas streams to remove competitive species, or extreme conditions of regeneration.

Several patents describe the removal of $CO_2$ from gas streams with adsorbents supported on alumina. U.S. Pat. No. 3,511,595, Fuchs, (1970) discloses the removal of $CO_2$ by reaction with an alkali metal carbonate coated on or impregnated in a high surface area carrier such as alumina. U.S. Pat. No. 3,865,924, Gidaspow et al., (1975) describes removing $CO_2$ with an alkali metal carbonate ground together with alumina. U.S. Pat. No. 4,433,981, Slaugh et al., (1984) discloses removing $CO_2$ with a calcined oxide or decomposable salt of an alkali metal or alkaline earth metal impregnated on a porous alumina support. U.S. Pat. No. 4,493,715, Hogan et al., (1985) discloses removing $CO_2$ from an olefin stream using a calcined alkali metal compound on alumina. In each of these patents, regeneration of the adsorbent is accomplished by heating in a temperature swing operation.

Although not part of the $CO_2$ adsorption art, a description of complex or double salts of magnesium carbonate is given in the text, *A Comprehensive Treatise on Inorganic and Theoretical Chemistry*, J. W. Mellor, John Wiley & Sons, N.Y., Vol. 4, pp. 367–376 (1960). This reference discloses that heating crystalline double salts of alkali metal and magnesium carbonate, e.g. $K_2Mg(CO_3)_2.4H_2O$ or $KHMg(CO_3)_2.H_2O$, results in evolution of $CO_2$ leaving a mixture of MgO and $K_2CO_3$. Although these carbonate double salts containing alkali metals and magnesium in stoichiometric proportions have been known for several years, there is no known reference to non-stoichiometric double salts nor to the study or use of this family of materials as $CO_2$ adsorbents.

U.S. Pat. No. 5,454,968, Nalette et al. (1995) which, while not referring to their compositions as double salts, describes the formation of pastes of mixtures of metal carbonate and alkali metal carbonate that can be formed into flat sheets which are used to sorb carbon dioxide from gas streams flowing through the sheets. The pastes are prepared by forming an aqueous solution of alkali metal carbonate, e.g. $K_2CO_3$, which is blended with a powder of metal carbonate, preferably silver carbonate. Other metals mentioned are zinc and magnesium. The paste is then formed into a flat sheet, constrained between screens, and heated to drive off water and to convert the silver carbonate to silver oxide. The $CO_2$ and $H_2O$ are said to react with $K_2CO_3$ during operation to form $KHCO_3$ which then reacts with AgO to form $AgCO_3$ and $K_2CO_3$ plus $H_2O$. Regeneration is accomplished by heating, e.g. to 160–220° C., to liberate $CO_2$ from the silver carbonate. The maximum operating temperature is said to be 250° C. The sorbents of Nalette et al. have been found in practice not to be totally satisfactory, particularly in high temperature operations where regeneration of the adsorbent must be accomplished by thermal swings rather than by pressure swings. Therefore, further improvements in $CO_2$ adsorbents is highly desirable.

BRIEF SUMMARY OF THE INVENTION

According to our invention a process is provided for removing carbon dioxide from a gas stream at temperatures in the range of 300 to 500° C. using magnesium oxide-containing adsorbents represented by the general chemical formula:

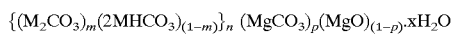

$$\{(M_2CO_3)_m(2MHCO_3)_{(1-m)}\}_n \ (MgCO_3)_p(MgO)_{(1-p)}.xH_2O$$

wherein M is alkali metal, $0 \leq m \leq 1$, $0 \leq n \leq 1.30$, $0 \leq p \leq 1$ and x represents the extent of hydration of the adsorbent, with the further provision that when n equals 0 the MgO is made by the dehydration and $CO_2$ removal of $\{MgCO_3\}_y.\{Mg(OH)_2\}_{(1-y)}.xH_2O$, in which $0.1 \leq y \leq 0.9$, and x indicates the extent of hydration. Adsorbents represented by this formula which contain an alkali metal salt and a magnesium salt are referred to as double salts. As is apparent from this formula, the adsorbents always contain some MgO plus either additional MgO or $MgCO_3$, depending upon the stage in the process of $CO_2$ adsorption. Further, the adsorbent may or may not contain alkali metal which has been found to promote the efficiency of the adsorbent. The atomic ratio of alkali metal to magnesium is always in the range of 0 to 2.60. Preferably the alkali metal is present in an atomic ratio of alkali metal to magnesium of at least 0.006, and more preferably of at least 0.08.

During operation alkali metal carbonate may be converted to the bicarbonate as indicated by the formula given above, but whether the alkali metal is present in the form of carbonate or bicarbonate, the atomic ratio of alkali metal to magnesium cannot exceed 2.60. The normal stoichiometric ratio of alkali metal to magnesium in such double salts is 2.0 as disclosed by Mellor, cited in the Background section. We believe these non-stoichiometric compositions are novel and, as shown by the data of the Examples, provide clear advantages when used in processes for reversibly adsorbing $CO_2$ from $CO_2$-containing gaseous mixtures under temperatures ranging from 300°–500° C. For purposes of interpretation, the term, non-stoichiometric, means that n of the enumerated formulae does not equal zero.

Another aspect of our invention is a non-stoichiometric double salt of alkali metal and magnesium represented by the formula

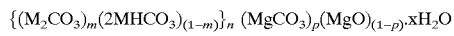

$$\{(M_2CO_3)_m(2MHCO_3)_{(1-m)}\}_n \ (MgCO_3)_p(MgO)_{(1-p)} \cdot xH_2O$$

wherein M is alkali metal, $0 \leq m \leq 1$, $0.003 \leq n \leq 0.925$, $0 \leq p \leq 1$ and x represents the extent of hydration. The atomic ratio of M to Mg is in the range of 0.006 and 1.85, preferably at least 0.08.

DETAILED DESCRIPTION OF THE INVENTION

Figure 1:
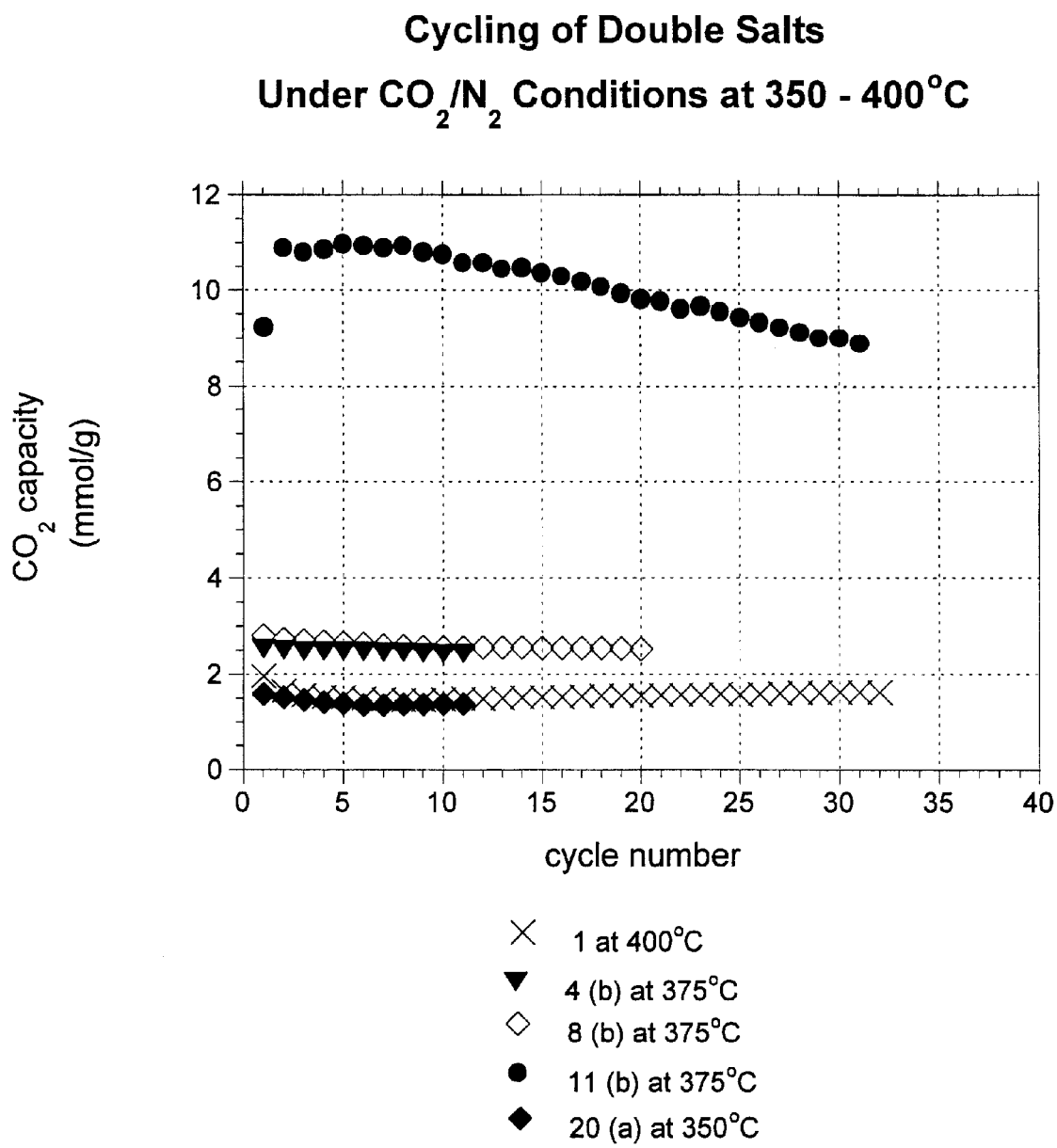
FIG. 1 is a graph showing the behavior of several adsorbents of the invention over a number of cycles simulating pressure swing adsorption of carbon dioxide at temperatures ranging from 350°–400° C.

Pressure swing adsorption (PSA) is one of the most efficient processes for separating gases. PSA has been proven very effective for the removal or recovery of carbon dioxide from gas streams. This invention is directed to solving the problem of operating such systems at high temperatures on the order of 300° to 500° C. where many adsorbents have low $CO_2$ capacity or are difficult to regenerate by desorption. In general, PSA systems are well known in the art and require no detailed explanation of their operation. PSA processes employ a series of steps which cycle between adsorption and desorption functions while being maintained at a certain temperature by changing the pressure of operation or partial pressure of the species to be adsorbed in packed absorber columns. For the purpose of this description, pressure swing adsorption is intended to include operation at atmospheric and superatmospheric pressures and, at least in the desorption phase of the cycle, at subatmospheric pressures, although such a process is sometimes referred to as vacuum swing adsorption. The improvements made possible by this invention in high temperature PSA adsorption of carbon dioxide are due to the adsorbents which have been developed specifically for and are used in this process.

All of the adsorbents of the invention contain magnesium oxide and usually magnesium carbonate which forms in the $CO_2$ adsorption process. The preferred adsorbents also contain alkali metal which has been found to impart water tolerance to the adsorbent. The alkali metal can be present in the form of a carbonate or bicarbonate. Such adsorbents are able to maintain practical capacity for $CO_2$ in the presence of various process levels of water vapor or steam. Adsorbents containing alkali metal can be prepared by treating a magnesium precursor salt with one or a mixture of alkali metals followed by thermal activation/decomposition. The preferred method, however, is through the preparation of an alkali metal-magnesium double carbonate salt, using procedures which form an adsorbent specifically adapted for use in PSA systems operated at 300° C. to 500° C.

With the exception of the measurements made in the presence of high temperature steam (see Example 6), all of the reported $CO_2$ capacity values were measured using 0.70 atm of $CO_2$ for the adsorption step and a $N_2$ purge for the regeneration step. The performance properties of the adsorbents are determined by their chemical and physical nature which depends on the methodology used to prepare them. The techniques of preparing these magnesium oxide-based materials are important in determining their superior performance in high temperature PSA adsorption of $CO_2$. The adsorbents made by the processes of the invention exhibit high reversible capacity for $CO_2$ in either dry or humid environments and are stable even during repeated cycling operations. The MgO and double salt-based adsorbents used in the invention are clearly distinct from high surface area MgO with respect to their physical and adsorptive properties. Conventional high surface area MgO has a much lower dynamic capacity for $CO_2$ and is unable to maintain its $CO_2$ capacity under humid conditions. The PSA operation of the invention can be used in a broad array of applications benefiting from the removal of carbon dioxide at temperatures ranging from 300° C.–500° C. such as in hydrogen production, flue gas clean up, and the like.

The adsorbents of the invention are compositions of matter which conform chemically to the general formula:

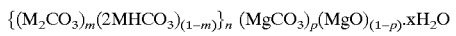

$$\{(M_2CO_3)_m(2MHCO_3)_{(1-m)}\}_n \ (MgCO_3)_p(MgO)_{(1-p)} \cdot xH_2O$$

where M stands for alkali metal or mixture of alkali metals, namely Li, Na, K, Rb, or Cs. Combinations of alkali metals are included in the general formula. For example, a mixture of any number of alkali metals can be utilized in making the adsorbents of the present invention. Among these alkali metals, sodium and potassium are preferred because they have been found to lead to higher $CO_2$ capacities for the adsorbents. Referring to the subscripts, m has a value of 0 to 1, inclusive and p has a value of 0 up to but less than 1, preferably not more than 0.95. From these values, it is apparent that the alkali metal can be present in the form of a carbonate or bicarbonate in any proportion, while the magnesium can be present in the form of a carbonate or oxide but some magnesium oxide must always be present. In the broad aspect of the invention the subscript n has a value of 0 to 1.30, inclusive. Accordingly, the atomic ratio of M to Mg does not exceed 2.60. Thus, when m equals 1, all the alkali metal is present as the carbonate. When m equals 0, all the alkali metal is present as the bicarbonate. Finally, in the general formula, the value of x indicates the extent of hydration of the adsorbent, which is not a critical consideration but is included for completeness. This value can vary, for example, from 1 to 15, inclusive but is frequently 4.

When the adsorbent contains no alkali metal, the adsorbent consists essentially of magnesium oxide, but not all types of magnesium oxide are effective for high temperature $CO_2$ adsorption. According to the invention, an adsorbent consisting essentially of magnesium oxide which is not promoted with alkali metal must be made by the dehydration and $CO_2$ removal of $\{MgCO_3\}_y \cdot \{Mg(OH)_2\}_{(1-y)} \cdot xH_2O$, in which $0.1 \leq y \leq 0.9$, and x indicates the extent of hydration. This conversion is effected by heating in an inert atmosphere for a period of time, generally a few hours, at a temperature of about 300 to 500° C. The resulting product exhibits good reversible $CO_2$ capacity at the high temperature required in PSA.

We have found that promotion of the MgO adsorbent with alkali metal carbonate or bicarbonate substantially improves adsorbent performance. The promotion can be done by adding to the precursor $(MgCO_3)_4 \cdot Mg(OH)_2 \cdot xH_2O$ an aqueous solution of alkali metal carbonate or bicarbonate. Some time should be allowed for this mixture to equilibrate, for example, several minutes to an hour or more, and then the solids are recovered, dried, and activated as previously described. Such promotion has been found to enhance the performance of the adsorbent under humid conditions.

While the above procedure produces an adsorbent which is operative in PSA processes for adsorbing $CO_2$ which are operated at temperatures ranging from 300°–500° C., it is much preferred to prepare a double salt of the alkali metal and magnesium. In this procedure, alkali metal ions and carbonate ions are incorporated into an aqueous solution of a magnesium salt. While any soluble magnesium salt can be used, it is preferred to use a nitrate, chloride or acetate of magnesium. To such a solution is added the alkali metal and carbonate ions, preferably as alkali metal carbonate or bicarbonate. Generally the dry carbonate or bicarbonate is added to the magnesium salt solution, but an aqueous solution of the alkali metal compound can be used. Alternatively, the alkali metal can be added to the magnesium salt solution as a salt having the same anion as the magnesium salt, and the carbonate can be incorporated separately, for example as ammonium carbonate. An important aspect of the invention resides in incorporating both alkali metal and carbonate ions into the magnesium salt solution so that a precipitate forms that can be recovered from the mother liquor. This precipitate, which starts to form almost immediately on combining the reactants, is the double salt. Recovery of the precipitate can be accomplished by filtration or centrifugation and the precipitate is then dried and activated.

The activation of the double salt is preferably carried out by heating in flowing dry inert gas, such as nitrogen, at a temperature in the range of 300 to 500° C. The time of activation can be determined experimentally, but is generally a few hours. Alternatively, the activation can be carried out in-situ while conducting the PSA process. PSA processes for $CO_2$ adsorption normally include a purge step in the cycle for desorption of adsorbed carbon dioxide, and this step can be used for activation since the temperature of the PSA process is in the operable range for activation.

Depending upon the atomic ratio of alkali metal to magnesium in the precipitate as formed in this process, the activation step can proceed following recovery and drying steps. If, however, this atomic ratio is not in the required range of 0.006 to 2.60, or even if it is in this range but a lower value is desired, this ratio can be adjusted by one or more water washing steps. Washing the precipitate with water will remove a portion of the alkali metal and, consequently affords a very convenient way in which to fine-tune the composition of the double salt adsorbent. The extent of washing required to achieve a desired alkali metal to magnesium atomic ratio will depend upon the composition of the original precipitate but can readily be determined experimentally. The use of multiple washes with analysis after each wash is a simple way to reach a desired composition without removing too much of the alkali metal. The washing steps involve simply working up the precipitate with deionized water and filtering or centrifuging to remove the water containing alkali metal salt which preferentially dissolves.

We have found that performance of these adsorbents can be greatly enhanced by adjusting the atomic ratio of alkali metal to magnesium within the given range which is preferably 0.08 to 2.60, inclusive. Drying and activation, as described above, is then carried out after the aqueous leaching of the precipitate. The compositions thus prepared exhibit high reversible capacity for $CO_2$ in either dry or humid environments, and are stable under repeated cycling operations. They have reversible $CO_2$ capacities as high as 12.9 mmol/g (57 percent by weight) which corresponds to a five-fold improvement over materials previously known in the art.

Key properties of these double salts such as adsorption isotherm shape and rate of adsorption and desorption can be controlled through careful attention to the conditions of synthesis. By virtue of their unique properties, these materials can be used in PSA processes for a broad range of applications at temperatures ranging from 300° C. to 500° C. The sensitivity of the adsorbent properties to the nature of synthesis enables the possibility to tailor these properties according to the requirements of a particular operation. It is possible to tailor the adsorbent for removal of $CO_2$ in applications which require low levels of $CO_2$ in the final product, or for operations that require the removal of bulk quantities of $CO_2$ but can tolerate higher levels of $CO_2$ in the product stream. Some of the more effective adsorbents provided by this invention have demonstrated desorption rates as high as five times those of prior art materials.

The capacity for $CO_2$ while employing a PSA cycle of the non-stoichiometric double salts of the invention under 0.70 atm of dry carbon dioxide at 350 to 400° C. can vary from 1.1 to 12.9 mmol $CO_2$ per gram of adsorbent (4.8 to 57% by weight), depending upon the salt composition and the conditions of preparation. Washed double salts, in general, have slightly reduced capacity, but exhibit more rapid sorption rates than the unwashed salts. Furthermore, such washed, magnesia-rich products have substantially higher capacity for $CO_2$ than the high surface area MgO prepared by traditional methods, such as by dehydration of $Mg(OH)_2$.

It has been found that in PSA processes conducted at 300° C. to 500° C., the sodium and potassium double salts maintained almost all of their capacity for $CO_2$ in the presence of low levels of water vapor. The capacity of the potassium double salt, for example, increased by 10 percent under wet carbon dioxide (20 Torr $H_2O$) versus dry carbon dioxide rich conditions. This material was also able to maintain about 75 percent of its capacity for $CO_2$ adsorption in the presence of 10 atmospheres of steam.

Other advantages and features of our invention will be apparent to those skilled in the art from the following examples which are illustrative only and should not be construed to limit our invention unduly.

EXAMPLE 1

This example presents the preparation and characterization of $(K_2CO_3)_n(MgCO_3)_p(MgO)_{(1-p)} \cdot xH_2O$. Sixty grams of $K_2CO_3$ was gradually added over several minutes to a rapidly stirred solution prepared by dissolving 20.0 g of $Mg(NO_3)_2 \cdot 6H_2O$ in 400 ml of distilled water. A slurry formed immediately which was stirred for an additional 60 minutes, after which time the solid was allowed to settle out overnight. The solid was isolated by filtration to dryness, then oven dried at 120° C. for 16 hours. The white powder was activated by heating at 400° C. under a purge of $N_2$ gas for 3 hours.

The sample was determined to have a K:Mg ratio of 1.80 by inductively couple plasma (ICP) analysis, which corresponds to a composition of $(K_2CO_3)_{0.90}(MgCO_3)_p(MgO)_{(1-p)} \cdot xH_2O$ for the unactivated powder. It had a $CO_2$ capacity, as measured on the thermogravimetric analyzer (TGA), of 0.48 and 1.65 mmol/g at 350° C. and 400° C., respectively. A TGA cyclic stability test was also carried out on this sample by exposing it to alternating dry $N_2$ and dry $CO_2$ purge gas streams at 400° C. After 32 cycles the adsorbent had a stable capacity of 1.6 mmol/g (see FIG. 1). The data for this sample and for those described in Examples 2–4, 6, 8–11 and 17–20 are summarized in Table 1. This example illustrates a typical preparation of $(K_2CO_3)_n(MgCO_3)_p(MgO)_{(1-p)} \cdot xH_2O$ and its adsorptive and stability properties.

EXAMPLE 2

The effect of washing of $(K_2CO_3)_n(MgCO_3)_p(MgO)_{(1-p)} \cdot xH_2O$ on its composition and adsorptive properties is shown in this example. Four beakers containing aqueous slurries of $(K_2CO_3)_n(MgCO_3)_p(MgO)_{(1-p)} \cdot xH_2O$ were prepared as described in Example 1. The first slurry, sample (a), was filtered to dryness without washing. The second, third and fourth slurries, samples (b), (c) and (d), were filtered to dryness, then washed 1, 3 and 7 times, respectively, with 250 ml portions of distilled water. The $K_2CO_3$ content diminished with increased washing, such that the sample washed 7 times only had 0.003 mole % $K_2CO_3$. The $CO_2$ capacities of the 4 samples were measured on the TGA at 350° C., 375° C. and 400° C. The data are given in Table 1. The washed samples had higher capacity at 350° C. than the unwashed sample, but the unwashed sample had the higher capacity at 400° C.

EXAMPLE 3

This example shows the effect of the reactant ratio on the composition and adsorptive properties of $(K_2CO_3)_n(MgCO_3)_p(MgO)_{(1-p)} \cdot xH_2O$. Sixty grams of $K_2CO_3$ was gradually added over several minutes to a rapidly stirred solution prepared by dissolving 22.26 g of $Mg(NO_3)_2 \cdot 6H_2O$ in 500 ml of distilled water. The resulting slurry was stirred for an additional 60 minutes, then allowed to settle out over night. The solid was filtered to dryness, then half of the filter cake, sample (a), was set aside as the "unwashed" sample. The other half of the filter cake, sample (b), was washed and filtered three times. Both samples (a) and (b) were oven dried at 120° C. for 16 hours. The same procedure was repeated two more times using 37.09 g and 74.18 g of $Mg(NO_3)_2 \cdot 6H_2O$ to prepare additional unwashed and washed samples (c), (d), (e) and (f). Based on the stoichiometric composition, the reactant molar ratios of these three preparations corresponded to a 150% potassium carbonate excess, samples (a) and (b), a 50% carbonate excess, samples (c) and (d), and a 25% carbonate deficiency, samples (e) and (f). The unwashed sample (c), prepared with a 50% carbonate excess, had the highest $CO_2$ capacity at 375° C. and 400° C. as measured by TGA. These data are summarized in Table 1.

EXAMPLE 4

This example shows the preparation of extruded pellets of adsorbent having the general formula $(K_2CO_3)_n(MgCO_3)_p(MgO)_{(1-p)} \cdot xH_2O$. Three hundred ninety-three grams of $K_2CO_3$ was gradually added over several minutes to a rapidly stirred solution prepared by dissolving 243 g of $Mg(NO_3)_2 \cdot 6H_2O$ in 3.0 L of distilled water. This reactant ratio corresponded to a 50% molar excess of carbonate required to form the stoichiometric double salt. A slurry formed immediately which was stirred for an additional 60 minutes after which time the solid was allowed to settle out overnight. The solid was filtered to the appropriate dryness for extrusion. A small portion of the solid was set aside as sample (a), activated and measured to have a capacity of 2.17 mmol/g at 375° C. The remainder of the wet paste was extruded without binder to prepare pelleted sample (b).

The ⅛" o.d. extruded pellets were activated at 325° C. for 6 hours under a purge of $N_2$ gas. The activated pellets had a $CO_2$ capacity of 2.26 mmol/g at 375° C. under dry gas conditions. A TGA cyclic stability test was also carried out on this sample by exposing it to alternating dry $N_2$ and dry $CO_2$ purge gas streams at 375° C. After 11 cycles the adsorbent had a stable capacity of 2.4 mmol/g (see FIG. 1). Extruded materials prepared in this manner had adsorptive properties comparable to the as-precipitated powders. Data for the samples of this Example are given in Table 1.

TABLE 1

Summary of Adsorbents Prepared via the Double Salts and Having the Formula: $(M_2CO_3)_n(MgCO_3)_p(MgO)_{(1-p)}$ where M = Li, Na, K, or Cs

| Example (sample) | Alkali Metal M | Number of Washes | $CO_2$ Capacity at 350:375:400° C. (mmol/g)** | M/Mg ratio from ICP (M = K, Na, Cs of Li) |
|---|---|---|---|---|
| 1 | K | 0 | 0.48:—:1.65 | 1.81 |
| 2 (a) | K | 0 | 0.61:1.16:1.55 | 1.67 |
| 2 (b) | K | 1 | 2.50:1.96:1.52 | 0.28 |
| 2 (c) | K | 3 | 1.28:1.26:1.04 | 0.021 |
| 2 (d) | K | 7 | 1.04:0.95:0.85 | 0.006 |
| 3 (a) | K | 0 | 1.14:2.19:1.89 | 1.40 |
| 3 (b) | K | 3 | 1.71:1.89:1.89 | 0.77 |
| 3 (c) | K | 0 | 1.21:2.45:2.02 | 1.45 |
| 3 (d) | K | 3 | 1.87:1.60:1.11 | 0.28 |
| 3 (e) | K | 0 | 0.06:0.07:0.11 | 6.77 |
| 3 (f) | K | 3 | 0.73:0.56:0.45 | 0.14 |
| 4 (a) | K | 0 | 1.74:2.17:1.47 | 0.58 |
| 4 (b) | K | 0 | 1.71:2.26:1.36 | 0.58 |
| 6 | K | 3 | 3.38:2.15:1.50 | 0.28 |
| 8 (a) | Na | 0 | 4.47:4.19:3.45 | 0.88 |
| 8 (b) | Na | 3 | 3.34:2.94:0.79 | 0.31 |
| 9 (a) | Na | 0 | 6.97:7.37:2.65 | 0.55 |
| 9 (b) | Na | 1 | 2.67:1.24:0.69 | 0.094 |
| 9 (c) | Na | 2 | 1.86:1.72:1.06 | 0.026 |
| 9 (d) | Na | 3 | 1.12:1.05:0.92 | 0.008 |
| 10 | Na | 0 | 1.22:2.29:3.29 | 2.41 |
| 11 (a) | Na | 0 | 11.90:12.89:1.73 | 0.36 |
| 11 (b) | Na | 0 | 6.16:11.21:2.54 | 0.36 |
| 17 (a) | Li | 0 | 0.17:0.13:0.13 | 0.95 |

TABLE 1-continued

Summary of Adsorbents Prepared via the Double Salts and Having the Formula: $(M_2CO_3)_n(MgCO_3)_p(MgO)_{(1-p)}$ where M = Li, Na, K, or Cs

| Example (sample) | Alkali Metal M | Number of Washes | $CO_2$ Capacity at 350:375:400° C. (mmol/g)** | M/Mg ratio from ICP (M = K, Na, Cs of Li) |
|---|---|---|---|---|
| 17 (b) | Li | 3 | 1.16:0.74:0.44 | 0.32 |
| 18 (a) | Cs | 0 | 1.54:1.53:1.35 | 0.20 |
| 18 (b) | Cs | 3 | 1.07:0.98:0.89 | 0.096 |
| 19 | NaK | 0 | —:2.15:1.55 | 0.247 & 0.241 |
| 20 (a) | KH | 0 | 1.54:1.27:1.09 | 0.860* |
| 20 (b) | KH | 3 | 1.12:1.00:0.91 | 0.006* |

*$KHCO_3/MgO$ ratio
**Adsorption: 0.70 atm $CO_2$; Desorption: $N_2$ purge

EXAMPLE 5

Figure 2:
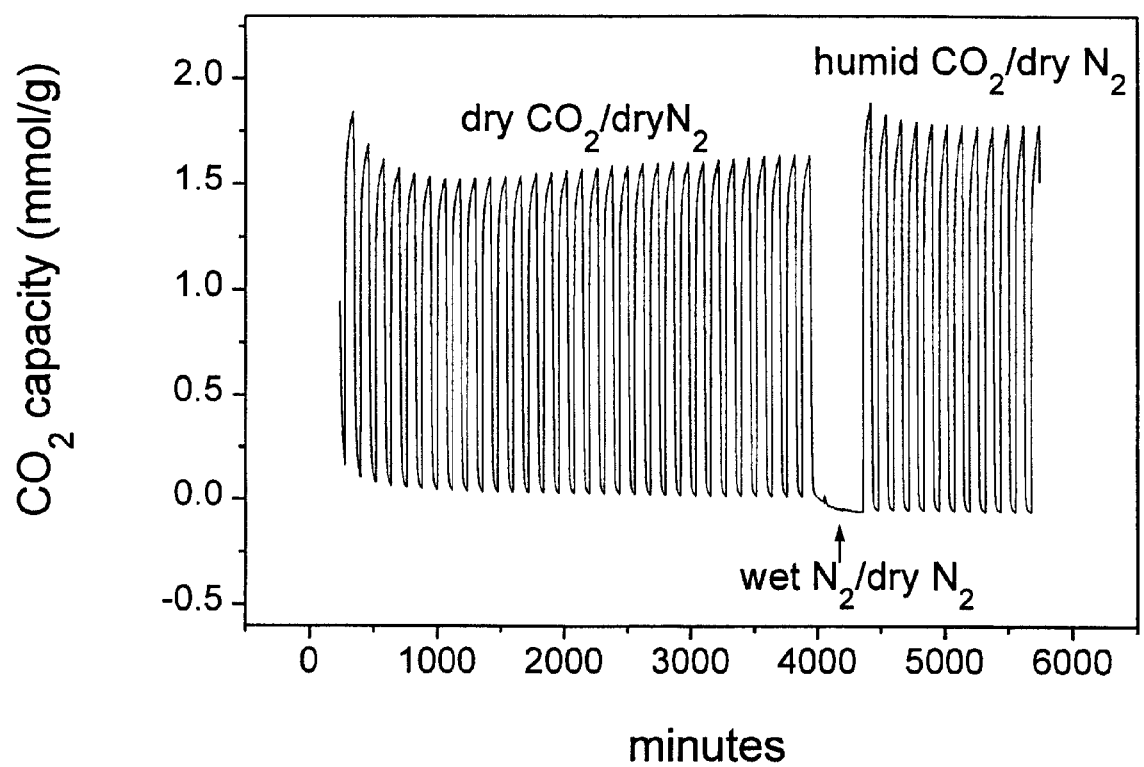
FIG. 2 is a graph comparing cyclic adsorption of carbon dioxide with an adsorbent of the invention under dry and humid conditions for the gas stream being treated.

The effect of low humidity on the adsorptive properties of the adsorbent of Example 1 is illustrated in this example. The $CO_2$ capacity of the adsorbent was determined by measuring its $CO_2$ capacity on the TGA under dry $CO_2$/dry $N_2$ cycling conditions, then comparing that with its $CO_2$ capacity as measured under humid $CO_2$/dry $N_2$ cycling conditions. The humid $CO_2$ contained 20 Torr of water vapor pressure, which was generated by saturating the dry $CO_2$ feed stream with water vapor at room temperature. In this manner the potassium double salt of Example 1 was found to have capacities of 1.6 and 1.8 mmol $CO_2$/g when tested under dry and humid conditions, respectively, at 400° C. These cycles are shown in FIG. 2.

The ability of $(K_2CO_3)_n(MgCO_3)_p(MgO)_{(1-p)}.xH_2O$ to maintain its $CO_2$ capacity in the presence of water vapor is atypical of the behavior shown by basic oxides. MgO, for example, under analogous testing conditions loses 90% of its $CO_2$ capacity in the presence of 20 Torr of water vapor pressure relative to its capacity under dry conditions. This run demonstrated that the $CO_2$ adsorptive properties of $(K_2CO_3)_n(MgCO_3)_p(MgO)_{(1-p)}.xH_2O$ are not significantly impacted by low levels of water in the gases being treated.

EXAMPLE 6

This example shows the effect of high temperature steam on the adsorptive properties of $(K_2CO_3)_n(MgCO_3)_p(MgO)_{(1-p)}.xH_2O$. A potassium double salt was prepared and washed three times as described for sample (d) of Example 3. Binderless extruded pellets of potassium double salt (KDS) were prepared as described in Example 4 in an effort to reproduce the properties observed for the powdered materials. The results were quite favorable as shown by the data reported in Table 1. Runs were also made with these pellets to determine their $CO_2/H_2O$ binary sorptive properties in the presence of 0.30 atmospheres of $CO_2$ and 10 atmospheres of steam. A sample of approximately 4 g of the extruded pellets was exposed to repetitive adsorption and desorption cycles. The adsorption step consisted of exposing the material to a flowing binary mixture of 0.30 atm $CO_2$ and 10 atm $H_2O$ at 375° C. This was followed by desorption under a purge of dry $N_2$ at the same temperature. After 7 such cycles the capacity stabilized at 1.5 mmol/g, establishing that this material maintained 75% of its capacity for $CO_2$ in the presence of 10 atmospheres of steam at 375° C., relative to its capacity under dry conditions at the same temperature. This cyclic stability is shown graphically in FIG. 3. This run demonstrated that 10 bar of water vapor had a minor impact on the $CO_2$ capacity of $(K_2CO_3)_n(MgCO_3)_p(MgO)_{(1-p)}.xH_2O$.

Figure 3:
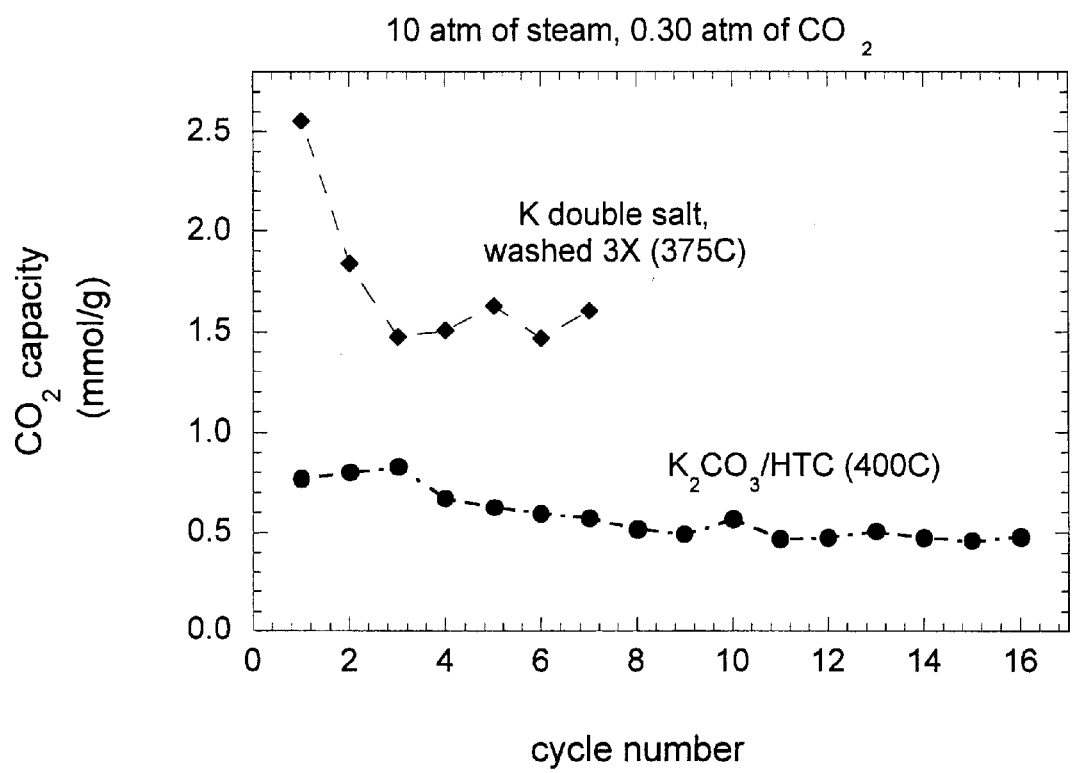
FIG. 3 is a graph comparing the performances in $CO_2$ adsorption under humid conditions for a washed double salt adsorbent of this invention versus another type of promoted adsorbent.

For comparison, a similar run was made with a potassium carbonate modified double layered hydroxide prepared by impregnating a powder of hydrotalcite (HTC) with an aqueous solution of $K_2CO_3$. The hydrotalcite (HTC) was a magnesium aluminum hydroxycarbonate supplied by Alcoa in the form of ⅛" extruded pellets. Samples were made by impregnating the pellets with 0.5, 2.0, and 5.0 molar solutions of potassium carbonate. The promoted HTC was activated by heating to 400–500° C. for 2 hours. Elemental analysis showed that these samples contained 3.66, 16.8 and 28.1 weight percent $K_2CO_3$, respectively, with Mg to Al ratios of approximately 3.0. All three samples had about the same $CO_2$ capacity at 400° C. of 0.28 to 0.39 mmol/g under dry cycling conditions. Under humid conditions as given above the HTC sample stabilized at 0.5 mmol/g CO2. As shown in FIG. 3, the potassium double salt, KDS, after it stabilized still had a $CO_2$ capacity in the presence of steam three times that of the promoted HTC.

EXAMPLE 7

Figure 4:
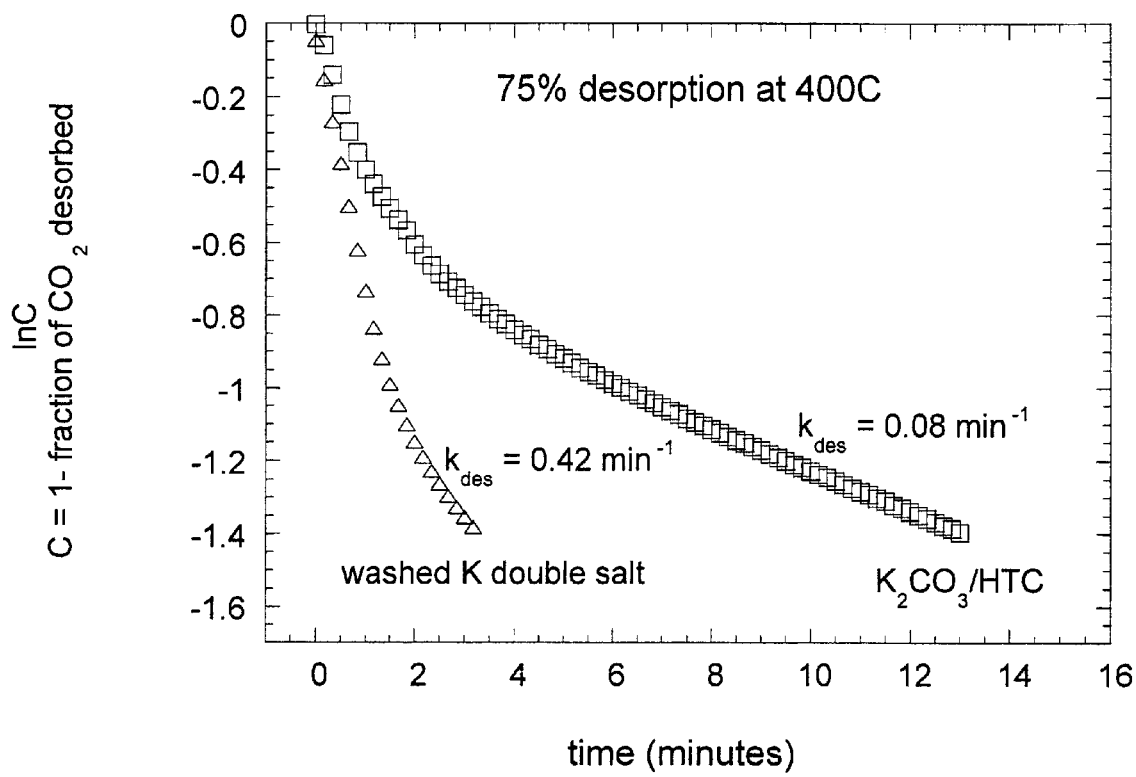
FIG. 4 is a graph comparing the desorption rates of a washed double salt of the invention with another type of promoted adsorbent at 400° C.

In this example the $CO_2$ desorption rate of $(K_2CO_3)_n(MgCO_3)_p(MgO)_{(1-p)}.xH_2O$ was measured. A sample of potassium double salt was prepared and washed three times as described in Example 2. Its capacity was measured by TGA in the usual manner. Its rate of $CO_2$ desorption was determined by monitoring the rate of weight loss upon exposure of a sample, previously saturated with $CO_2$, to an $N_2$ purge at 400° C. The desorption rate constant ($k_{des}$) was calculated by fitting the desorption profile to a first order rate expression as shown in FIG. 4. The rate constant for the washed double salt was shown to be a factor of 5 faster than that of the promoted hydrotalcite (HTC) described in Example 6.

EXAMPLE 8

The preparation and characterization of $(Na_2CO_3)_n(MgCO_3)_p(MgO)_{(1-p)}.xH_2O$ is shown in this example. Fifty grams of $Na_2CO_3$ was gradually added over several minutes to a rapidly stirred solution prepared by dissolving 10.0 g of $Mg(NO_3)_2.6H_2O$ in 400 ml of distilled water. The resulting thick slurry was stirred for an additional 60 minutes, after which time the slurry was allowed to stand overnight. The solid was isolated by filtration to dryness, and half was collected and set aside as the "unwashed" product, sample (a). The remaining filter cake, sample (b), was washed three times with 250 ml portions of distilled water. The two samples (a) and (b) were oven dried at 120° C. for 16 hours. The white powders were activated by heating at 400° C. under a purge of $N_2$ gas for 3 hours.

The unwashed and washed samples were measured by ICP analysis to have Na:Mg ratios of 0.88 and 0.31, which correspond to compositions for samples (a) and (b) of $(Na_2CO_3)_{0.44}(MgCO_3)_p(MgO)_{(1-p)}.xH_2O$ and $(Na_2CO_3)_{0.16}(MgCO_3)(MgO)_{(1-p)}.xH_2O$, respectively. The unwashed sample (a) had a reversible $CO_2$ capacity of 4.47 mmol/g as measured at 350° C. on the TGA. These data are summarized in Table 1.

A TGA cyclic stability test was carried out on sample (b) of nominal composition $(Na_2CO_3)_{0.16}(MgCO_3)_p(MgO)_{(1-p)}.xH_2O$, by exposing it to alternating dry $N_2$ and dry $CO_2$ purge gas streams at 375° C.

After 20 such cycles the adsorbent had a stable capacity of 2.5 mmol/g (see FIG. 1). This example illustrates a typical preparation of $(Na_2CO_3)_n(MgCO_3)_p(MgO)_{(1-p)} \cdot xH_2O$ and its adsorptive and stability properties.

EXAMPLE 9

This example shows the effect of washing of $(Na_2CO_3)_n(MgCO_3)_p(MgO)_{(1-p)} \cdot xH_2O$ on its composition and adsorptive properties. A quantity of 301.0 g of $Na_2CO_3$ was gradually added over several minutes to a rapidly stirred solution prepared by dissolving 243.0 g of $Mg(NO_3)_2 \cdot 6H_2O$ in 3.0 L of distilled water. This reactant stoichiometry corresponded to a 50% molar excess of carbonate. The resulting thick slurry was stirred for an additional 30 minutes, after which time the slurry was allowed to stand overnight. The solid was isolated by filtration to dryness, and approximately 40% was collected and set aside as the "unwashed" product, sample (a). The remaining filter cake was washed with 1.5 L of distilled water, then a second fraction of the solid was set aside as sample (b). This procedure was repeated two more times in preparing samples (c) and (d) until a total of four samples had been generated: unwashed, single, double and triple washed. The highest capacity was seen for the unwashed sample (7.37 mmol/g at 375° C.). The data are summarized in Table 1.

EXAMPLE 10

This example illustrates the preparation of $(Na_2CO_3)_n(MgCO_3)_p(MgO)_{(1-p)} \cdot xH_2O$ with a high ratio of alkali metal to magnesium. Dissolve 50 g of $Na_2CO_3$ in 200 mL of distilled water in a first beaker. Dissolve 10 g of $Mg(NO_3)_2 \cdot 6H_2O$ into 30 mL of distilled water in a second beaker. Place both beakers into a hot water bath maintained at 60–70° C. After allowing enough time for the two solutions to reach bath temperature, the two solutions were combined into a third beaker. The resulting precipitate in the third beaker was then stirred for 5 minutes, then placed back into the hot water bath for an additional 4 hours. The beaker was removed from the hot water bath and the solid precipitate was allowed to settle out at room temperature overnight. The sample was filtered to dryness, then oven dried at 120° C. overnight. The sample was analyzed by ICP to have a Na/Mg ratio of 2.41. The $CO_2$ capacities of the 4 samples were measured on the TGA at 350° C., 375° C. and 400° C. The data are given in Table 1.

EXAMPLE 11

This example illustrates the preparation of extruded pellets of $(Na_2CO_3)_n(MgCO_3)_p(MgO)_{(1-p)} \cdot xH_2O$. The procedure described in Example 4 was repeated using 3.75 L of distilled water instead of 3.0 L. None of the solid product collected by filtration was washed. A small sample of the solid was set aside as sample (a), dried, activated and measured to have a capacity of 12.9 mmol/g at 375° C. The remainder of the solid, sample (b), was partially dried and extruded as a wet paste without the addition of a binder. The ⅛" o.d. pellets were activated at 325° C. for 6 hours under a purge of $N_2$ gas. The activated pellets had a $CO_2$ capacity of 11.2 mmol/g at 375° C. These data are summarized in Table 1.

A TGA cyclic stability test was also carried out on sample (b) by exposing the pellets to alternating dry $N_2$ and dry $CO_2$ purge gas streams at 375° C. After 31 such cycles the adsorbent had a capacity of 8.9 mmol/g (see FIG. 1). Extruded materials prepared in this manner had comparable adsorptive properties to the as-precipitated powders.

EXAMPLE 12

This example shows the effect of low humidity on the adsorptive properties of $(Na_2CO_3)_n(MgCO_3)_p(MgO)_{(1-p)} \cdot xH_2O$. Extruded pellets of the sodium double salt were prepared as described in Example 11. The effect of low moisture levels on the $CO_2$ capacity of this material was determined by measuring its $CO_2$ capacity on the TGA under dry $CO_2$/dry $N_2$ cycling conditions, then comparing that with its $CO_2$ capacity as measured under humid $CO_1$/dry $N_2$ cycling conditions. The humid $CO_2$ contained 20 Torr of water vapor pressure, which was generated by saturating the dry $CO_2$ stream with water vapor at room temperature. In this manner $(Na_2CO_3)_n(MgCO_3)_p(MgO)_{(1-p)} \cdot xH_2O$ was shown to have capacities of 11.6 and 7.2 mmol $CO_2$/g when tested under dry and low humidity conditions, respectively, at 400° C. Under low humidity conditions the sodium double salt retained over 60% of its capacity for $CO_2$. This run demonstrated that $(Na_2CO_3)_n(MgCO_3)_p(MgO)_{(1-p)} \cdot xH_2O$ maintains the majority of its capacity for $CO_2$ in the presence of low levels of water vapor.

EXAMPLE 13

This example shows the preparation and characterization of $(K_2CO_3)_n(MgCO_3)_p(MgO)_{(1-p)} \cdot xH_2O$ from $MgCl_2 \cdot 6H_2O$. Over a period of several minutes 20.7 g of $K_2CO_3$ was gradually added to a rapidly stirred solution prepared by dissolving 10.2 g of $MgCl_2 \cdot 6H_2O$ in 400 ml of distilled water. A slurry formed immediately which was stirred for an additional 60 minutes, after which time the solid was allowed to settle out overnight. The solid was isolated by filtration to dryness, then oven dried at 120° C. for 16 hours. The white powder was activated by heating at 400° C. under a purge of $N_2$ gas for 3 hours. This sample had a $CO_2$ capacity, as measured on the thermogravimetric analyzer, of 0.66 mmol/g at 400° C. Measurements were also made at 300° C. and 500° C. This is an example of $(K_2CO_3)_n(MgCO_3)_p(MgO)_{(1-p)} \cdot xH_2O$ prepared using a magnesium salt source of a different counter anion. The data for Examples 13–16 are summarized in Table 2.

EXAMPLE 14

Preparation and characterization of $(Na_2CO_3)_n(MgCO_3)_p(MgO)_{(1-p)} \cdot xH_2O$ from $MgCl_2 \cdot 6H_2O$ are illustrated by this example. Over a period of several minutes 15.9 g of $Na_2CO_3$ was gradually added to a rapidly stirred solution prepared by dissolving 10.2 g of $MgCl_2 \cdot 6H_2O$ in 400 ml of distilled water. A slurry formed immediately which was stirred for an additional 60 minutes, after which time the solid was allowed to settle out overnight. The solid was isolated by filtration to dryness, then oven dried at 120° C. for 16 hours. The white powder was activated by heating at 400 ° C. under a purge of $N_2$ gas for 3 hours. This sample had a $CO_2$ capacity, as measured on the thermogravimetric analyzer, of 1.17 mmol/g at 400° C., see Table 2. This is an example of $(Na_2CO_3)_n(MgCO_3)_p(MgO)_{(1-p)} \cdot xH_2O$ prepared using a magnesium salt source of a different counter anion.

EXAMPLE 15

This example shows preparation and characterization of $(K_2CO_3)_n(MgCO_3)_p(MgO)_{(1-p)} \cdot xH_2O$ from $Mg(CH_3CO_2)_2 \cdot 4H_2O$. Fifty ml of a 2 M solution of $K_2CO_3$ was added dropwise over 30 minutes to a solution prepared by dissolving 10.72 g of $Mg(CH_3CO_2)_2 \cdot 4H_2O$ in 100 ml of distilled water. A colorless slurry gradually formed which was stirred for an additional 60 minutes after completion of the carbonate addition. The slurry was allowed to settle out overnight. The solid was isolated by filtration to dryness, then oven dried at 120° C. for 16 hours. The white powder was activated by heating at 400° C. under a purge of $N_2$ gas for 3 hours.

The sample was determined to have a K:Mg ratio of 0.686 by ICP analysis, which corresponds to a composition of $(K_2CO_3)_{0.34}(MgCO_3)_p(MgO)_{(1-p)} \cdot xH_2O$ for the unactivated powder. It had a $CO_2$ capacity, as measured on the thermogravimetric analyzer (TGA), of 1.07 mmol/g at 400° C. This is an example of $(K_2CO_3)_n(MgCO_3)_p(MgO)_{(1-p)} \cdot xH_2O$ prepared using a magnesium acetate salt source as the counter anion and an alternative mode of carbonate addition using an aqueous solution of the alkali metal carbonate. The data are summarized in Table 2.

EXAMPLE 16

This example shows the preparation and characterization of $(Na_2CO_3)_n(MgCO_3)(MgO)_{(1-p)} \cdot xH_2O$ from $Mg(CH_3CO_2)_2 \cdot 4H_2O$. Fifty ml of a 2 M solution of $Na_2CO_3$ was added dropwise over 30 minutes to a solution prepared by dissolving 10.72 g of $Mg(CH_3CO_2)_2 \cdot 4H_2O$ in 100 ml of distilled water. A colorless slurry gradually formed which was stirred for an additional 60 minutes after completion of the carbonate addition. The slurry was allowed to settle out overnight. The solid was isolated by filtration to dryness, then oven dried at 120° C. for 16 hours. The white powder was activated by heating at 400° C. under a purge of $N_2$ gas for 3 hours.

The sample was determined to have a Na:Mg ratio of 0.234 by ICP analysis, which corresponds to a composition of $(Na_2CO_3)_{0.12}(MgCO_3)_p(MgO)_{(1-p)} \cdot xH_2O$ for the unactivated powder. It had a $CO_2$ capacity, as measured on the thermogravimetric analyzer (TGA), of 1.30 mmol/g at 400° C. This is an example of $(Na_2CO_3)_n(MgCO_3)_p(MgO)_{(1-p)} \cdot xH_2O$ prepared using a magnesium salt source of a different counter anion and an alternative mode of carbonate addition. The data are summarized in Table 2.

TABLE 2

Summary of Adsorbents Having the Formula
$(K_2CO_3)_n(MgCO_3)_p(MgO)_{(1-p)}$
Prepared from Magnesium Chloride and Magnesium Acetate

| Example | Soluble Magnesium Salt | Capacity At 300:450:500° C. (mmol/g)* | M/Mg Ratio from ICP (M = K, Na, Cs or Li) |
|---|---|---|---|
| 13 | $MgCl_2$ | 0.74:0.66:0.66 | — |
| 14 | $MgCl_2$ | 1.15:1.17:1.13 | — |
| 15 | $Mg(CH_3CO_2)$ | 1.11:1.07:0.91 | 0.686 |
| 16 | $Mg(CH_3CO_2)$ | 1.47:1.30:0.96 | 0.234 |

*Adsorption: 0.70 atm $CO_2$; Desorption: $N_2$ purge

EXAMPLE 17

The preparation and characterization of $(Li_2CO_3)_n(MgCO_3)_p(MgO)_{(1-p)} \cdot xH_2O$ which is a lithium-magnesium double carbonate salt is shown by this example. A solution of $(NH_4)_2CO_3$ prepared by dissolving 37.5 g of carbonate in 150 ml of distilled water, was added dropwise over 60 minutes to a second solution of mixed metal nitrates prepared by dissolving 10.0 g of $Mg(NO_3)_2 \cdot 6H_2O$ and 10.7 g of $LiNO_3$ in 100 ml of distilled water. After the addition of carbonate was complete, the resulting slurry was mixed for 15 minutes. The solid was collected by filtration. Half of the solid was set aside and characterized as the "unwashed" sample (a). The remainder, sample (b), was washed 3 times with 250 ml portions of distilled water. The unwashed and washed samples (a) and (b) were analyzed by ICP to have Li:Mg ratios of 0.95 and 0.32, respectively. Sample (b) had more favorable $CO_2$ adsorptive properties with a capacity of 1.16 mmol/g at 350° C. These data are summarized in Table 1. This example also illustrates an alternative mode of combining the alkali metal carbonate with the magnesium salt by adding the alkali metal and carbonate ions separately to the magnesium salt solution.

EXAMPLE 18

The preparation and characterization of $(Cs_2CO_3)_n(MgCO_3)_p(MgO)_{(1-p)} \cdot xH_2O$ which is a cesium-magnesium double carbonate salt is shown by this example. Over a period of several minutes 16.8 g of $Cs_2CO_3$ was gradually added to a rapidly stirred solution prepared by dissolving 3.0 g of $Mg(NO_3)_2 \cdot 6H_2O$ in 50 ml of distilled water. A slurry formed immediately which was stirred for 120 minutes, after which time the solid was allowed to settle out overnight. The solid was collected by filtration. Half was set aside and characterized as the "unwashed" sample (a). The remainder, sample (b), was washed 3 times with 100 ml portions of distilled water. The unwashed and washed samples (a) and (b) were analyzed by ICP to have Cs:Mg ratios of 0.20 and 0.10, respectively. Sample (a) had more favorable $CO_2$ adsorptive properties with a capacity of 1.53 mmol/g at 350–375° C. These data are summarized in Table 1.

EXAMPLE 19

The preparation and characterization of $(NaKCO_3)_n(MgCO_3)_p(MgO)_{(1-p)} \cdot xH_2O$, which is a mixed alkali metal-magnesium double carbonate salt, are shown by this example. A physical mixture of 103.5 g of $K_2CO_3$ and 79.5 g of $Na_2CO_3$ was ground using a mortar and pestle. This mixture was gradually added over several minutes to a rapidly stirred solution prepared by dissolving 128.2 g of $Mg(NO_3)_2 \cdot 6H_2O$ in 2 liters of distilled water. A resulting slurry was stirred for 60 minutes, then allowed to settle out overnight. The solid was isolated by filtration to dryness, then extruded to form pellets and activated as described in Example 4.

The sample was determined to have a Na:K:Mg ratio of 0.247:0.241:1.00 by ICP analysis. It had a $CO_2$ capacity, as measured on the TGA, of 2.15 and 1.55 mmol/g at 375° C. and 400° C., respectively. The data for this sample are summarized in Table 1.

EXAMPLE 20

The preparation and characterization of $(KHCO_3)_n(MgCO_3)_p(MgO)_{(1-p)} \cdot xH_2O$ which is a potassium bicarbonate double salt are shown by this example. Forty-five grams of $KHCO_3$ was gradually added over several minutes to a rapidly stirred solution prepared by dissolving 20.0 g of $Mg(NO_3)_2 \cdot 6H_2O$ in 400 ml of distilled water. The resulting slurry was stirred for 60 minutes, then the solid was allowed to settle out over-night. The solid was collected by filtration. Half was set aside and characterized as the "unwashed" sample (a). The remainder, sample (b) was washed 3 times with 250 ml portions of distilled water.

The unwashed and washed samples (a) and (b) were analyzed by ICP to have K:Mg ratios of 0.43 and 0.003, respectively. Sample (a) had more favorable $CO_2$ adsorptive properties with a capacity of 1.54 mmol/g at 350° C. The data are summarized in Table 1.

A TGA cyclic stability test was also carried out on sample (a) by exposing it to alternating dry $N_2$ and dry $CO_2$ purge gas streams at 350° C. After 11 such cycles the adsorbent had a stable capacity of 1.4 mmol/g (see FIG. 1).

Comparative Example 21

This is a comparative example showing the characterization of an adsorbent of potassium and magnesium carbonates prepared using the procedure disclosed in U.S. Pat. No. 5,454,968, cited and discussed in the Background section above (the '968 Patent").

Four different compositions according to the '968 Patent were prepared as follows: A sorbent with a target composition of 60 wt % $MgCO_3$, 40 wt % $K_2CO_3$ was prepared by dissolving 20 g $K_2CO_3$ in 40 ml of deionized water. This potassium carbonate solution was mixed with 34.5 g $(MgCO_3)_4 \cdot Mg(OH)_2 \cdot 5 H_2O$ in a blender for 5 minutes. The resulting paste, sample (a), was then dried overnight in a 120° C. oven. Two other representative compositions, samples (b) and (c), with target compositions of 78 wt % $MgCO_3/22$ wt % $K_2CO_3$ and 95 wt % $MgCO_3/5$ wt % $K_2CO_3$, respectively, were prepared in a similar manner. A target 53/47 composition was prepared in a similar manner except $Mg(OH)_2 \cdot MgCO_3 \cdot 3 H_2O$ was used as the metal carbonate source. Twenty g $K_2CO_3$ was dissolved in 40 g $H_2O$ and this $K_2CO_3$ solution was mixed with 25.4 g of $Mg(OH)_2 \cdot MgCO_3 \cdot 3 H_2O$ in a blender for 5 minutes. The resulting paste, sample (d), was removed from the blender and dried overnight at 120° C.

These four compositions of the '968 Patent were analyzed by TGA for $CO_2$ sorption and desorption properties. The results are shown in Table 3.

EXAMPLE 22

A potassium-magnesium double salt composition was prepared according to the method of the invention with a target composition that compared closely with the best of the compositions of the '968 Patent prepared according to Example 21. The composition of this double salt corresponded to the general formula: $(K_2CO_3)_n(MgCO_3)_p(MgO)_{(1-p)} \cdot xH_2O$. Six grams of $Mg(NO_3)_2 \cdot 6 H_2O$ were dissolved in 400 ml of deionized water with stirring and 13.8 g of solid $K_2CO_3$ was added to the $Mg(NO_3)_2$ solution with stirring. The resulting white precipitate was stirred for an hour and the solids were allowed to settle overnight. Vacuum filtration was used to separate the solids from the mother liquor and the solids were dried for several hours on the filter under ambient conditions. The solids, sample (a), were then removed from the filter and dried overnight at 120° C.

Sample (b) was prepared in the same manner arriving at a slightly different weight ratio of $MgCO_3$ and $K_2CO_3$ but still very close to the best of the compositions of the '968 Patent according to Example 21. In this case 5.2 g of $Mg(NO_3)_2$ was dissolved in 400 ml of deionized water. After the $Mg(NO_3)_2$ had completely dissolved, 18.3 g of $K_2CO_3$ was slowly added to the solution, stirred for an hour, and then allowed to settle for 18 hours. The solids were vacuum filtered and dried at 120° C.

These materials can also be prepared in a similar manner by using solutions of $K_2CO_3$ in place of the solid. The two compositions, samples (a) and (b), prepared according to the invention were analyzed by TGA for $CO_2$ adsorption properties in the same manner as was done for the compositions of the '968 Patent according to Example 21. The results are given in Table 3. The sorbents prepared according to the invention had almost twice the reversible $CO_2$ capacity found for the comparable composition of Example 21, sample (b), at 350° C. Also, the kinetics for the sorbents of the invention are twice as fast as the best composition of the '968 Patent according to Example 21. These data demonstrate that the adsorbents prepared by the method of the invention are highly suited for use in pressure swing adsorption separations where adsorbents with rapid adsorption and desorption rates are required.

Analysis of the sorbents made by the procedure of the invention by SEM, XRD and BET surface area analysis showed that the product of this example was composed of 75 nm spherical particles which is in stark contrast to the compositions of the '968 Patent according to Example 21. The BET surface areas of samples (a) and (b) of this Example were 33 $m^2/g$ and 64 $m^2/g$, respectively. Based upon data from both XRD and transmission electron microscope (TEM) analyses, the materials of samples (a) and (b) of this Example were amorphous.

TABLE 3

Comparison of Adsorbents of the Invention to the UTC Compositions

| Example (sample) | Adsorbent Preparation Methodology | Wt % $MgCO_3$: Wt % $K_2O_3$* | $CO_2$ Capacity at 350:400:450° C. (mmol/g)** | $CO_2$ Desorption Rate Constant (95%, 400° C.) $k_{des}$ (min$^{-1}$) |
|---|---|---|---|---|
| 21 (a) | UTC | 60:40 | 0.92:1.14:1.14 | 0.088 |
| 21 (b) | UTC | 78:22 | 3.04:2.07:1.57 | 0.091 |
| 21 (c) | UTC | 95:5 | 1.14:1.63:0.74 | 0.062 |
| 21 (d) | UTC | 53:47 | 0.74:0.45:0.35 | 0.061 |

TABLE 3-continued

Comparison of Adsorbents of the Invention to the UTC Compositions

| Example (sample) | Adsorbent Preparation Methodology | Wt % $MgCO_3$: Wt % $K_2O_3$* | $CO_2$ Capacity at 350:400:450° C. (mmol/g)** | $CO_2$ Desorption Rate Constant (95%, 400° C.) $k_{des}$ (min$^{-1}$) |
|---|---|---|---|---|
| 22 (a) | Invention | 82:18 | 5.41:2.03:— | 0.223 |
| 22 (b) | Invention | 75:25 | 5.65:2.42:1.70 | 0.175 |

*Target composition
**Adsorption: 0.70 atm $CO_2$; Desorption: $N_2$ purge

Comparative Example 23

This example shows the characterization of high surface area MgO prepared by the dehydration of magnesium hydroxide. This material was prepared by heating a beaker containing 5 g of MgO and 200 ml of distilled water to 90–95° C. for 3 hours. The solid was isolated by filtration, then placed in a furnace and calcined at 315° C. Half of the material, sample (a), was removed from the furnace after 3 hours and the remainder, sample (b), was removed after a total of 24 hours. The resulting MgO samples (a) and (b) after calcination for 3 and 24 hours had surface areas of 139 and 236 m$^2$/g, and reversible $CO_2$ capacities of 0.39 and 0.35 mmol/g at 375° C., respectively. Data for these two samples, (a) and (b), which represent prior art high surface area magnesium oxide are given in Table 4.

EXAMPLE 24

Magnesium oxide sorbents were prepared according to the invention by the dehydration and $CO_2$ removal of magnesium hydroxycarbonate, $(MgCO_3)_4.Mg(OH)_2.5 H_2O$. A first sample was prepared by activating a sample of $(MgCO_3)_4.Mg(OH)_2.5 H_2O$ by heating for two hours at 400° C. under flowing $N_2$. The resulting MgO, sample (a), had a surface area of 23 m$^2$/g, and a reversible $CO_2$ capacity of 1.14 mmol/g at 400° C. using dry $CO_2$. A second sample (b) was prepared by heating $(MgCO_3)_4.Mg(OH)_2.5H_2O$ for two hours at 500° C. This sample had lower reversible $CO_2$ capacities at 400° C. and 450° C. of 0.47 mmol/g demonstrating that the calcination temperature is an important variable to control in the production of MgO that sorbs $CO_2$ reversibly. The data for these samples (a) and (b) are summarized in Table 4. Examples 23 and 24 show that the method of preparation is of central importance in the formation of MgO having favorable adsorptive properties. Higher surface areas do not necessarily dictate higher $CO_2$ capacities.

EXAMPLE 25

This example shows the preparation and characterization of a high capacity MgO adsorbent promoted with $K_2CO_3$ using a commercially available MgO source. Two samples were prepared as follows: Two 5 g quantities of $(MgCO_3)_4.Mg(OH)_2.5H_2O$ were mixed with two different solutions of $K_2CO_3$. Samples (a) and (b) were prepared using 0.3 M and 1.0M $K_2CO_3$ solutions, respectively. These two samples were then allowed to stand and equilibrate at room temperature for 1 hour. The liquids were then filtered off and the solids dried overnight at 120° C.

Sample (a) and (b) were then analyzed by ICP and found to have K:Mg ratios of 0.31 and 0.71, respectively. As the potassium content increased for these two samples, there was a decrease in the surface area of the adsorbents from 16.9 m$^2$/g, sample (a), to <1 m$^2$/g, sample (b). There was, however, no apparent change in the X-ray diffraction patterns of either of the promoted MgO samples after the treatement with $K_2CO_3$. The dry $CO_2$ capacity of sample (a), as measured by TGA methods, was 1.76 mmol/g and 1.43 mmol/g at 400° C. and 450° C., respectively. These data are summarized in Table 4.

EXAMPLE 26

This example shows the effect of low humidity on the adsorptive properties of MgO and $K_2CO_3$ promoted MgO. The $CO_2/H_2O$ binary sorptive properties of MgO prepared as described by the first method of Example 24, sample (a) which was calcined at 400° C., and the $K_2CO_3$ promoted sample (a) of Example 25 were evaluated as samples (a) and (b), respectively, of this example using TGA techniques (cycling between humid $CO_2$ and dry $N_2$ cycles). The results are summarized in Table 4. The $CO_2$ capacity under humid conditions was 0.97 mmol/g and 2.02 mmol/g for the unpromoted MgO sorbent, sample (a), and the $K_2CO_3$ promoted MgO sorbent, sample (b), respectively. The $CO_2$ capacity of the unpromoted sample decreased in humid $CO_2$, but when MgO was promoted with $K_2CO_3$ the capacity and the kinetics of the sample improved, showing that the promotion of MgO with $K_2CO_3$ enhanced the stability of the MgO in the presence of water.

TABLE 4

Characterization of MgO and $K_2CO_3$/MgO

| Example (sample) | Adsorbent | Capacity at 375:400:450 ° C. (mmol/g)** | $CO_2$ desorption rate constant (75%) $k_{des}$ (min$^{-1}$) | Surface Area (m$^2$/g) |
|---|---|---|---|---|
| 23 (a) | *MgO | 0.39:0.37:— | — | 139 |
| 23 (b) | *MgO | 0.35:0.36:— | — | 236 |
| 24 (a) | **MgO | —:1.14:0.92 | 0.116 | 23 |
| 24 (b) | **MgO | —:0.47:0.47 | 0.127 | |
| 25 (a) | $K_2CO_3$/**MgO | —:1.76:1.43 | 0.338 | 16.9 |
| ***26 (a) | **MgO | —:0.97:0.61 | 0.159 | |
| *26 (b) | $K_2CO_3$/MgO | —:2.02:1.53 | 0.513 | |

*from $Mg(OH)_2$
**from Mg hydroxycarbonate
***humid $CO_2$
**Adsorption: 0.70 atm $CO_2$; Desorption: $N_2$ purge

Comparative Example 27

This example characterizes MgO sorbent prepared by the decomposition of $MgCO_3$ instead of $(MgCO_3)_4.Mg(OH)_2.5H_2O$. A sample of $MgCO_3$ was decomposed to MgO by heating for two hours at 500° C. under flowing nitrogen. Analysis of the resulting material by TGA showed that it had a $CO_2$ capacity of 0.15 mmol/g at 400° C. under dry $CO_2/N_2$ cycling conditions with a $CO_2$ pressure at 0.70 atm. Another sample of MgO prepared in the same way was tested under both dry and low humidity conditions and found to have $CO_2$ capacities of 0.134 and 0.013 mmol/g, respectively, at 400° C. The measurements by TGA for the dry conditions used dry $CO_2$/dry $N_2$ cycling and humid $CO_2$/dry $N_2$ cycling for the humid conditions. The humid $CO_2$ contained 20 Torr of water vapor pressure which was generated by saturating the dry $CO_2$ with room temperature water vapor. These results showed that for the MgO prepared by decomposition of $MgCO_3$ low levels of humidity reduced the $CO_2$ capacity of the sorbent by 90 percent. In contrast, the MgO prepared according to the invention, Example 24, sample (a), decreased in $CO_2$ capacity under humid conditions, Example 26 sample (a), by only 15 percent at 400° C. See Table 4.

Other embodiments of our invention will be apparent to those skilled in the art from the foregoing disclosure and the following claims without departing from the spirit or scope of our invention.

What is claimed is:

1. In a pressure swing adsorption process for adsorbing carbon dioxide from a gas stream containing carbon dioxide the improvement which comprises bringing said gas stream into contact with a magnesium oxide-containing adsorbent at a temperature in the range of 300 to 500° C., said adsorbent represented by the chemical formula:

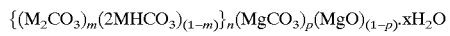

$$\{(M_2CO_3)_m(2MHCO_3)_{(1-m)}\}_n(MgCO_3)_p(MgO)_{(1-p)}\cdot xH_2O$$

wherein M is an alkali metal, $0 \leq m \leq 1$, $0 \leq n \leq 1.30$, $0 \leq p < 1$ and x represents the extent of hydration, with the proviso that when n equals 0 the MgO is made by the dehydration and $CO_2$ removal of $\{MgCO_3\}_y \cdot \{Mg(OH)_2\}_{(1-y)} \cdot xH_2O$; in which $0.1 \leq y \leq 0.9$ and x indicates the extent of hydration.

2. The process of claim 1 wherein n has a value greater than 0, said adsorbent is a double salt precipitate of M and magnesium made by the addition of ions of M and carbonate ions into an aqueous solution of a magnesium salt, and the atomic ratio of M to Mg is in the range of 0.006 to 2.60.

3. The process of claim 2 wherein said magnesium salt is selected from nitrates, chlorides and acetates of magnesium.

4. The process of claim 2 wherein said ions of and carbonate ions are added to said magnesium salt solution as alkali metal carbonate or alkali metal bicarbonate.

5. The process of claim 1 wherein said alkali metal is selected from the group consisting of lithium, sodium, potassium, rubidium, and cesium.

6. The process of claim 2 wherein the atomic ratio of M to magnesium in the double salt precipitate is 1.0 or above.

7. The process of claim 2 wherein the atomic ratio of M to magnesium in said precipitate is below 1.0.

8. The process of claim 7 wherein the double salt precipitate has been separated and washed with water until said atomic ratio of alkali metal to magnesium is below 1.0.

9. The process of claim 1 wherein the temperature is in the range of 350 to 450° C.

* * * * *

UNITED STATES PATENT AND TRADEMARK OFFICE
CERTIFICATE OF CORRECTION

PATENT NO. : 6,280,503 B1
DATED : August 28, 2001
INVENTOR(S) : Mayorga, et al.

It is certified that error appears in the above-identified patent and that said Letters Patent is hereby corrected as shown below:

<u>Column 20,</u>
Line 14, insert -- "M" -- after the words "said ions of"

Signed and Sealed this

Twenty-sixth Day of February, 2002

Attest:

Attesting Officer

JAMES E. ROGAN
*Director of the United States Patent and Trademark Office*